March 19, 1968  J. W. HENDRY  3,373,502
PRE-HEATER WITH VERTICALLY FLOWING AIR STREAM
Filed July 25, 1966  6 Sheets-Sheet 1

INVENTOR
JAMES W. HENDRY
BY
Woodhams, Blanchard & Flynn
ATTORNEYS

INVENTOR.
JAMES W. HENDRY

March 19, 1968 J. W. HENDRY 3,373,502
PRE-HEATER WITH VERTICALLY FLOWING AIR STREAM
Filed July 25, 1966 6 Sheets-Sheet 5

INVENTOR.
JAMES W. HENDRY
BY
Woodhams, Blanchard & Flynn
ATTORNEYS

March 19, 1968  J. W. HENDRY  3,373,502
PRE-HEATER WITH VERTICALLY FLOWING AIR STREAM
Filed July 25, 1966  6 Sheets-Sheet 6

INVENTOR.
JAMES W. HENDRY
BY
Woodhams, Blanchard & Flynn
ATTORNEYS

United States Patent Office 3,373,502
Patented Mar. 19, 1968

3,373,502
PRE-HEATER WITH VERTICALLY FLOWING
AIR STREAM
James W. Hendry, Fremont, Ohio, assignor to Borg-Warner Corporation, Chicago, Ill., a corporation of Illinois
Filed July 25, 1966, Ser. No. 567,630
19 Claims. (Cl. 34—10)

This invention relates to an improved apparatus for heating and feeding plastic granules, and more particularly relates to an improved apparatus for preheating organic plastic granules and for feeding same to a consuming device, which apparatus is of simplified construction and is particularly adapted to prevent accumulation and overheating of plastic granules therein.

The present invention is an improvement of the apparatus set forth in application Ser. No. 471,835, filed July 14, 1965, and assigned to the assignee of the present invention. Although apparatus of the prior application has been found quite satisfactory in practice under a wide variety of operating conditions and with a wide variety of plastic materials, it has been found that in certain, relatively isolated circumstances involving, for example, plasticizable materials which are excessively soft and sticky even at relatively low temperatures or normally less adhesive materials which are heated to a higher degree than normal and so become sticky, there may be some tendency for the heated plastic to stick to the perforate walls of the heating chamber of one embodiment of the above-mentioned application, and so be held through several heating processes. Depending upon the plastic material involved, this may lead to charring or to other forms of discoloration of the material. The charred material may then be carried out of the apparatus and ultimately appear as an imperfection in the product molded or extruded from the plastic material. This problem, although not normally occurring with normal use of the machine and with most materials, was recognized heretofore and the above-mentioned application includes a further embodiment which provides an effective solution for the difficulty but is relatively complex in construction.

The apparatus of the present application is intended as a further solution to the above problem and is the result of a continuing effort to improve the apparatus of the above-mentioned application. The apparatus of the present application differs substantially from the aforementioned prior application and, as a result, not only provides an effective solution to the above problem, but simultaneously provides other advantages including a more certain operation and a substantially simplified structure.

Thus, it is an object of this invention to provide an improved apparatus for preheating plastic granules and feeding same to a consuming device such as the plasticizing zone of an injection molding or extrusion machine.

A further object of this invention is to provide an apparatus, as aforesaid, capable of heating, over a wide range of temperatures, a wide variety of organic plastic materials, particularly those which tend to become relatively soft so as to extrude into or mechanically interlock with adjacent perforations of the apparatus and/or which tend to adhere relatively strongly to roughened or perforate apparatus walls with which they come into contact.

A further object of this invention is to provide apparatus, as aforesaid, which is substantially simpler in construction than the apparatus of the above-mentioned prior application and which has fewer moving parts and fewer actuating devices than the apparatus of the aforementioned application without sacrifice in performance.

A further object of this invention is to provide an apparatus, as aforesaid, in which heated air is circulated past and through a quantity of granules in a heating chamber, in which the air passes out of the heating chamber through a perforated wall at the bottom thereof, in which the heating chamber is moved laterally off the bottom perforated wall when the plastic material has been heated to the desired degree, in which such movement of the heating chamber is utilized to effect cleaning of the perforated wall to remove any traces of plastic material therefrom and to either remove same from the apparatus or carry same along with the preheated plastic mass for feeding to a consuming device.

A further object of this invention is to provide an apparatus, as aforesaid, in which means are provided for positively ejecting the heated plastic material from the heating chamber and in which the heating chamber has relatively smooth side walls along which the material will readily slide during its removal therefrom, so as to avoid retention of plastic material in the heating chamber and recycling thereof.

A further object of this invention is to provide an apparatus, as aforesaid, capable of delivering a plurality of preheated masses or "cakes" of plastic material to the consuming device within one cycle of operation.

A further object of this invention is to provide an apparatus, as aforesaid, in which the heating air is required to pass through a thickness of granular material equivalent only to the thickness of one of the preheated cakes.

A further object of this invention is to provide an apparatus, as aforesaid, in which the preheated cakes are normally retained in and positively bounded by the preheating chamber during transfer thereof to the location for feeding the cakes to the consuming device.

A further object of this invention is to provide an apparatus, as aforesaid, in which the fines are expelled downwardly through the openings in such perforate wall and are thereby removed from the normal path of the plastic material to be delivered to the consuming device, and so not to contaminate the preheated material, or any product made therefrom.

A further object of this invention is to provide an apparatus, as aforesaid, in which the unheated granules are transferred solely by allowing same to fall freely in response to gravity, positive displacing means being provided for transferring the heated cakes.

A further object of this invention is to provide an apparatus, as aforesaid, which is relatively economical to manufacture, which is sturdy in construction which will be capable of a long substantially trouble-free operating life under difficult operating conditions with a minimum of maintenance and, which will be readily maintainable by persons acquainted with the apparatus of this general type.

Other objects and purposes of this invention will be apparent to persons acquainted with apparatus of this general type upon reading the following specification, and inspecting the accompanying drawings.

Figure 1:
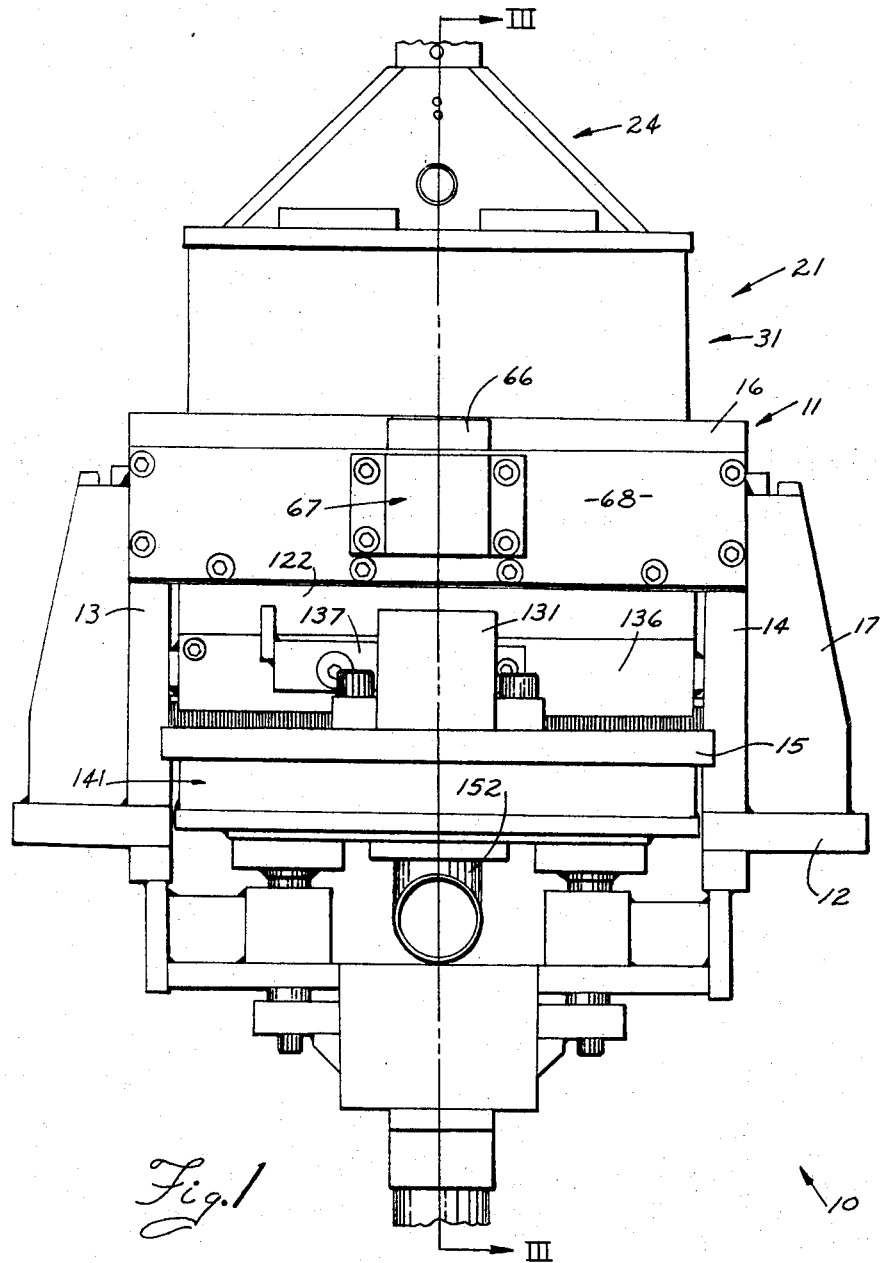
FIGURE 1 is a fragmentary end elevational view of an apparatus embodying the invention.
Figure 2:
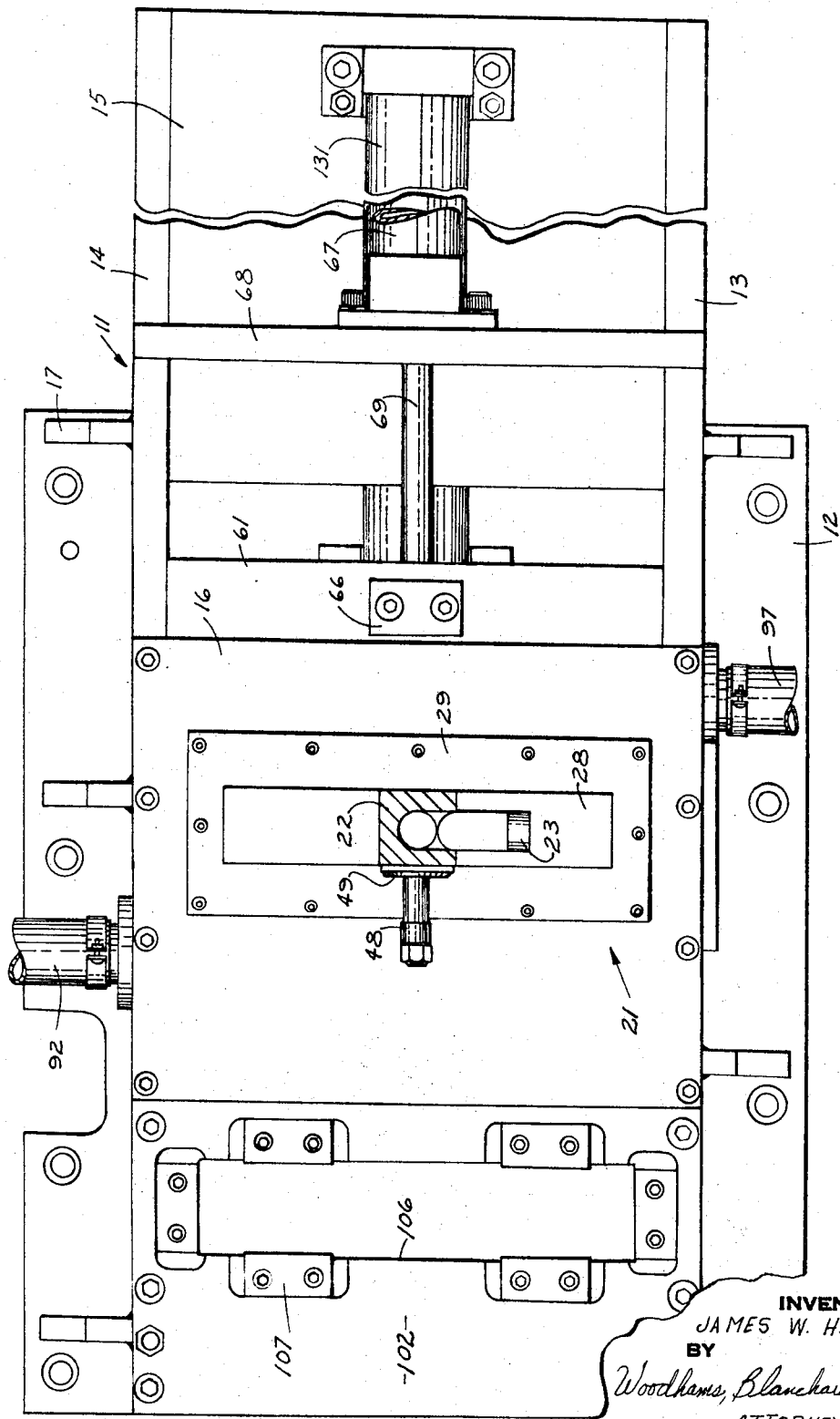
FIGURE 2 is a fragmentary, partially broken top view of the apparatus embodying the invention.

Certain terminology will be used in the following description for convenience in reference only and will not be limiting. The words "upwardly," "downwardly," "rightwardly" and "leftwardly" will designate directions in the drawings to which reference is made. The words "forwardly" and "rearwardly" will refer to the direction of material flow through the device and to the opposite direction, respectively, "forwardly" being the normal flow direction. The words "inwardly" and "outwardly" will refer to directions toward and away from, respectively, the geometric center of the device and designated parts thereof. Said terminology will include the words above specifically mentioned, derivatives thereof and words of similar import.

*General description*

In general, the objects and purposes of this invention are met by providing an apparatus for preheating and feeding granular plastic material including a holding chamber and means for metering a preselected amount of organic plastic granules thereinto from a source of such material. A heating box is reciprocally disposed in a horizontal transfer passage and is normally spaced below the holding chamber by an entrance passage. The heating box is open at its top and bottom ends and defines a heating chamber therewithin which is preferably compartmented to define a series of subchambers distributed longitudinally of the transfer passage. The entrance passage is provided with perforate side walls which communicate with a source of heated air, the heated air being forced under pressure into the entrance passage and heating chamber. An exhaust manifold having a perforate upper wall is disposed immediately below and snugly against the heating box and communicates therewith through a suitable opening in the transfer passage so that the heated air can move through the heating passage and out the exhaust manifold. A gate is provided between the holding chamber and the entrance passage which opens to allow granules in the holding chamber to drop through the entrance passage into the heating chamber therein to be heated by the heated air passing down through such chamber and out the exhaust manifold. Means are provided to retract exhaust manifold downwardly away from the heating box and further means are provided to thereafter slide the heating box along the transfer passage away from the exhaust manifold and entrance passage to an outlet. Normally the heated plastic material in the heating box ejects therefrom by gravity and enters the outlet. In specific instances, however, the heated plastic can, if desired, be positively ejected from the heating box by means of a ram. Means are provided to remove any plastic material from the perforate exhaust manifold as the heating box is moved toward the outlet and to either cause such material to drop through the perforated wall into the exhaust manifold or, in the case of larger granules, to be deposited in the outlet passage. Thus, retention of plastic material on the side walls of the heating chamber or on the perforated wall of the exhaust manifold for more than one cycle in the operation of the apparatus, is positively precluded.

*Detailed description*

The apparatus 10 (FIGURES 1–4) embodying the invention includes a housing 11 comprising a transversely spaced pair of elongated table members 12 surmounted by spaced, upstanding side walls extending longitudinally of said table and indicated at 13 and 14. The intermediate portions of the side walls extend above the end portions thereof and support a generally horizontal top wall 16. A bottom wall 15 extends between the side walls 13 and 14 above the table 12. Exterior braces 17 supported on the table 12 brace the side walls 13 and 14.

The top wall 16 carries a granule supply apparatus generally indicated at 21. At the upper end of the apparatus 21 is a source of granules of any convenient type capable of supplying granules over a timed interval. In the particular embodiment shown the source of granules comprises a suitable hopper, a fragment of which is indicated at 22, having a suitable valve 23 at the lower end thereof, for allowing or preventing flow of granules from the hopper in response to gravity.

The granule supply apparatus 21 further includes a generally triangular spreading chamber 24 below the hopper 22 and in communication therewith. The spreading chamber 24 extends transversely of the housing 11 and is of somewhat lesser width. The spreading chamber 24 has closely spaced upstanding end walls 26 and 27 and upwardly converging side walls 28. The spreading chamber 24 is supported on the top wall 29 of a holding chamber 31 disposed immediately therebelow.

A spreading device 32 is disposed within the spreading chamber 24. The spreading device 32 includes a downwardly diverging pair of deflection plates 34 pivotally supported at their upper ends at a location spaced closely below the hopper 22 by a pin 36 supported between the end walls 26 and 27. The deflection plates 34 are snugly but slideably disposed between the walls 26 and 27 and extend downwardly nearly to the top of wall 29. Thus, plastic granules dropping from the hopper 22 are spread transversely by the deflection plates and can pass only between the walls 28 and the corresponding deflection plates. A tent-shaped guard 37 covers the hinged together upper ends of the deflection plates to prevent plastic material from entering the pivot area. Openings 38 and 39 are provided through the top wall 29 to open the lower end of the spreading chamber from the side wall 28 to locations below the end portions of the deflection plates 34. Springs 41 supported on the wall 29 below the corresponding ones of the deflection plates 34 urge such plates outwardly toward the walls 28.

The spreading device 32 further includes a shaft 42 which extends through the walls 26 and 27 below the pin 36 and is pivotally supported thereon. A disk 43 is keyed to the shaft 42 for rotation therewith within the spreading chamber 24. The disk 43 is provided with a pair of opposed, preferably identical spiral slots 44. Arms 46 extend inwardly from the deflection plates 34 and are provided with followers 47 at the inner ends thereof, which followers ride in the spiral slots 44. Thus, rotation of the disk in a clockwise direction from its position shown in FIGURE 4 will cause the followers 47 and hence the deflection plates 34 to pivot inwardly toward each other against the urging of the springs 41 to increase the space between the deflection plates 34 and the side walls 28 of the spreading chamber.

Figure 7:
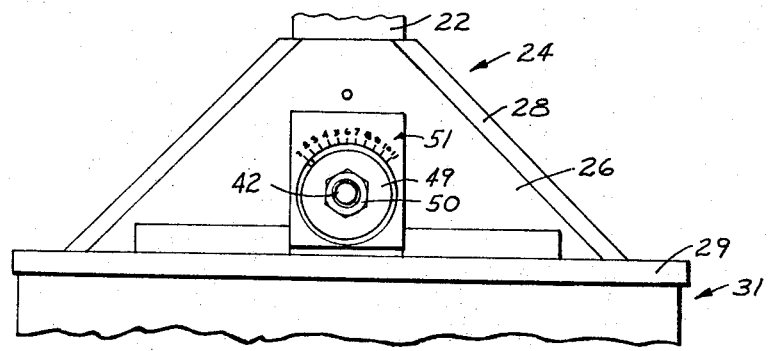
FIGURE 7 is a fragmentary end elevational view taken from the leftward side of FIGURE 3 and disclosing the metering device thereof.

The leftward (FIGURE 3) end of the shaft 42 extends beyond the wall 26. A generally cylindrical grip 48 is keyed to the leftward end of the shaft 42 and is provided at its inner end with a radial flange 49. The grip 48 is held on the shaft by a nut 50. Indicia generally indicated at 51 are provided on the radial flange 49 (FIGURE 7) and on the wall 26 to indicate the angular position of the flange 49 and disk 43 and thereby to indicate the spacing of the deflection plates from the walls 28. Thus, by adjusting the angular position of the shaft 42, the deflection plates 34 can be set to spread the flow of granules in a manner to insure a uniform depth of granules in the holding chamber 31 therebelow.

If desired, the spreading device 32 described above may alternatively take any other convenient form desired. For example, it is contemplated that a plurality of generally parallel, horizontally spaced bars, not shown, may be extended across the bottom of the spreading chamber 24, the portion of the bottom wall 29 between the openings 38 and 39 preferably being omitted, for slowing and spreading of the falling granules sufficiently to cause a relatively uniform cross-sectional distribution of the granular material. It has been found that this simplified alternative spreading arrangement will, under most circumstances, achieve a sufficiently even distribution of the granules to meet the purposes of the invention.

The holding chamber is preferably rectangular in plan and is bounded by upstanding walls 56 supported on the top wall 16 of the housing and in turn supports the top wall 29. The holding chamber 31 is both wider and longer than the base of the spreading chamber 24. The wall 16 is open within the confines of the side walls 56 of the chamber 31 as indicated at 57. An upstanding plate 58 extends transversely across the lower portion of the chamber 31 for dividing same in half.

A horizontal gate 61 (FIGURES 3 and 4) is disposed immediately below the top wall 16 for alternatively opening and closing the bottom end of the holding chamber 31. The side edges of the gate 61 are slideably disposed in grooves 62 extending along the top edge of the side walls 13 and 14, such grooves here being bushed. An opening 63 is provided through the gate 61 intermediate the ends thereof, the opening 63 corresponding in size to the portion of the holding chamber 31 on one side of the divider plate 58. Thus, as the gate 61 slides rightwardly from its closed position shown in FIGURE 3, it will first open the leftward side of the holding chamber 31 to allow granules therein to empty therefrom and thereafter will open the rightward side of the chamber 31 to similarly discharge the granular contents thereof. If desired, the gate 61 may be provided with a plurality of coolant passages 64 supplied with coolant fluid, such as water, from any convenient source thereof, here indicated schematically at C in FIGURE 4, for preventing the temperature of said gate from rising sufficiently to heat granules located in the holding chamber 31 thereabove, or granules passing through the opening 63 therein.

The rightward end of the gate 61 extends beyond the top wall 16. A stock block 66 is fixed atop the rightward end of the gate 61 and limits against the rightward end of the top wall 16 when the opening 63 has moved leftwardly beyond the chamber 31 and slightly beyond that position shown in FIGURE 3. The gate 61 is preferably reciprocated by a pressure fluid cylinder 67 actuated by a suitable source S of fluid under pressure. The pressure fluid cylinder 67 is spaced rightwardly from the gate 61, the leftward end of the cylinder being supported upon the upstanding leg of a generally L-shaped bracket 68 which extends across and is supported between side walls 13 and 14. The piston rod 69 of the pressure fluid cylinder 67 extends leftwardly through an opening 71 in the bracket 68 and is threadedly fixed at its free end to a mounting block 72 pendently fixed to the rightward end of the gate 61. Thus, reciprocation of the piston rod 69 results in a corresponding reciprocation of the gate 61.

Figure 3:
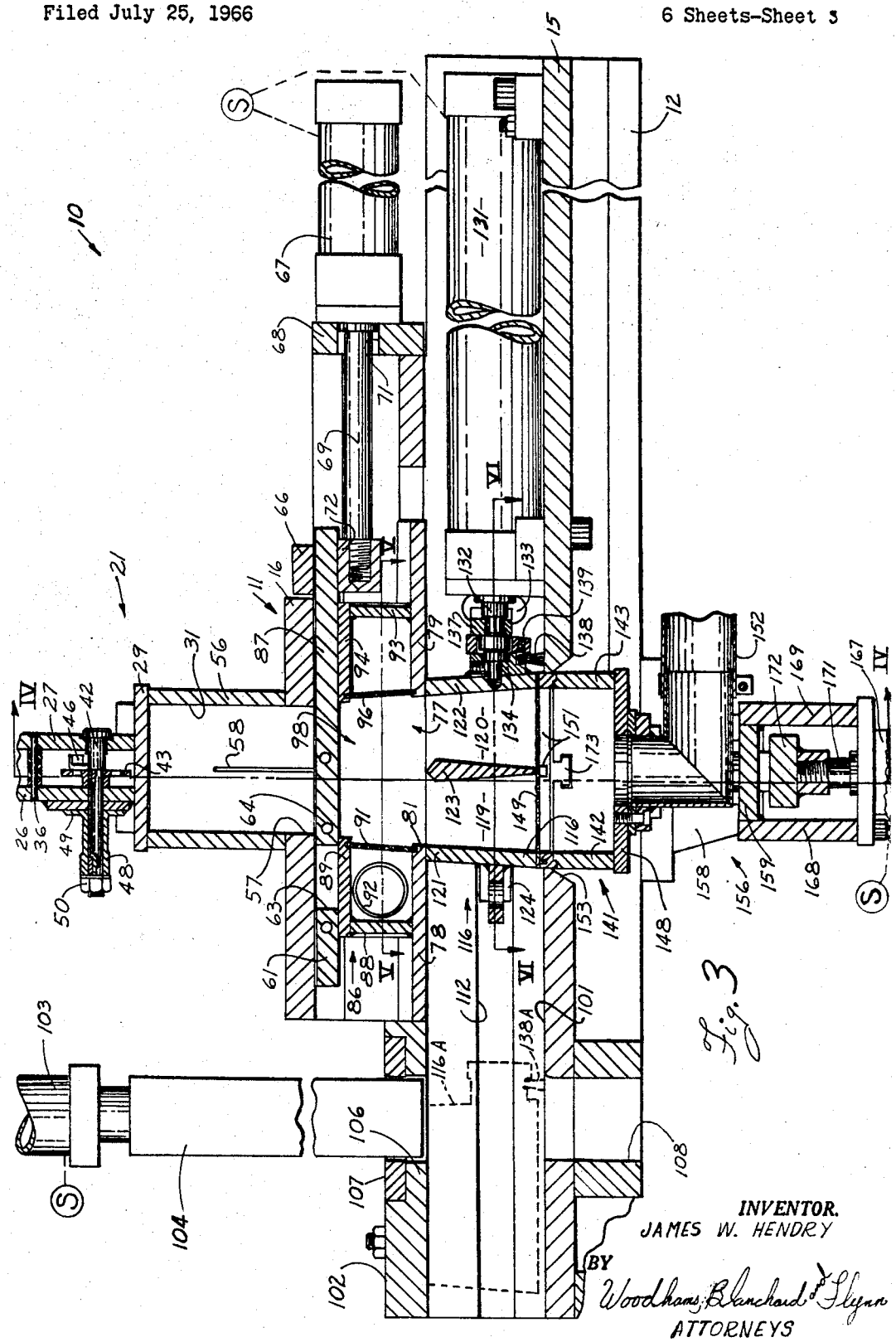
FIGURE 3 is a central cross-sectional view taken on the line III—III of FIGURE 1.

Liners 76 and 77 (FIGURES 3, 4, 5) are fixed to the side walls 13 and 14, respectively, immediately below the gate 61 and extend longitudinally therealong preferably to the ends of the top wall 16. The liners 76 and 77 are well spaced above the table 12. In the particular embodiment shown, the liners 76 and 77 are each made up of a sequentially joined set of longitudinally distributed plates. Coplanar shelves 78 and 79 are extended horizontally between the lower edge portions of the liners 76 and 77. The leftward (FIGURE 3) shelf 78 terminates below the leftward end of the top wall 16 and the rightward shelf 79 preferably extends somewhat beyond the rightward end of the top wall 16. The shelves 78 and 79 are spaced longitudinally along the housing 11 to define an opening 81 therebetween, the opening 81 being centered beneath the holding chamber 31 and being of slightly greater longitudinal extent as seen in FIGURE 3.

Air inlet manifolds 86 and 87 are disposed between the gate 61 and the shelves 78 and 79, respectively. The manifolds 86 and 87 are opposed to each other longitudinally along the housing 11. The manifold 86 has an upstanding outer wall 88 fixed to and supported on the shelf 78 at a point spaced to the left of the rightward edge. The wall 88 supports the outer end of an upper wall 89, the walls 88 and 89 extending between the liners 76 and 77 and being affixed thereto. A generally upstanding perforate inner wall 91, which may be of wire mesh, perforated metal or the like, extends between the inner edges of the shelf 78 and top wall 89 and between the liners 76 and 77. A narrow inlet conduit 92 extends through the side wall 14 and liner 77 into the end of the manifold 86 and is connected to a source F (FIGURE 5) of heated fluid, preferably at a pressure somewhat above atmospheric pressure.

The manifold 67 is preferably identical to the manifold 86 above described and is disposed at the inner edge of shelf 79. The manifold 87 includes an upstanding outer wall 93 (FIGURE 5), a top wall 94, and a perforate inner wall 96. The manifold 87 is supplied with heated fluid, preferably air from the source F by a conduit 97 extending through the side wall 13 and the liner 76.

The perforate walls 91 and 96 preferably diverge downwardly (FIGURE 3) from each other at a small angle to avoid catching granules dropping therebetween. The upper ends of the perforate walls 91 and 96 and the inner ends of the upper walls 89 and 94 preferably are stepped outwardly slightly from, and the liners 76 and 77 preferably being aligned with, the edges of the opening 57 defining the lower end of the holding chamber 31. The perforate walls 91 and 96, and liners 76 and 77 may be considered to bound an entrance passage extending downwardly from the holding chamber 31.

A transfer passage 101 extends longitudinally of the housing 11 between the side walls 13 and 14 thereof and between the bottom wall 15 thereof and shelves 78 and 79. Thus, the transfer passage 101 extends directly beneath the vertical entrance passage 98.

A guide plate 102 (FIGURES 2 and 3) extends leftwardly from the leftward end of the shelf 78, the bottom piece of the guide plate 102 being coplanar with the bottom face of the shelf 78. The side walls 13 and 14 are preferably reduced in height to the left of shelf 78, so that the guide plate 102 may be fixedly supported thereupon. A pressure fluid cylinder 103 is supported by any convenient means, not shown, above the guide plate 102 for vertically reciprocating a downwardly extending ram generally indicated at 104. The guide plate 102 is provided with an opening 106 therethrough into which the ram 104 extends. The cross section of the ram and opening 106 are generally similar, the hole 106 preferably being slightly larger and equipped with a plurality of adjustably mounted guide bushings 107 spaced around the perimeter thereof for snugly but slideably guiding the ram 104 therethrough. A vertically extending guide passage 108 is vertically aligned with the ram 104 and opening 106 extends downwardly through the wall 15 for allowing entrance of heated plastic cakes hereinafter described thereinto. The cylinder 103 is preferably supplied with pressure fluid from a source S of any convenient type capable of extending the ram downwardly into the passage 108. The guide passage 108, opening 106 and ram 104 are elongated horizontally and transversely of the housing 11. The guide passage 108 corresponds in cross section substantially to the ram 104 and opening 106.

The pressure fluid cylinder 103 and openings 106 and 108 may be similar to corresponding parts of the aforementioned application Ser. No. 471,835. The guide passage 108 may lead to any desired consuming device, such as the plasticizing screw of an injection molding or extrusion machine such a screw being disclosed, for example, in copending application Ser. No. 459,222 assigned to the assignee of the present invention.

The transfer passage 101 is provided with grooves 111 and 112 (FIGURES 3, 4 and 6) in the side walls 13 and 14 respectively, and vertically spaced intermediate the table 12 and shelves 78 and 79. The grooves 111 and 112 are preferably identical and extend from a point beneath the rightward end of the rightward manifold 87 to the leftward end of the transfer passage 101.

A generally rectangular heating box 116 is disposed in the transfer passage 101 and comprises an upstanding pair of end walls 117 and 118. The end walls 117 and 118 are disposed between a pair of generally upstanding side walls 121 and 122 which preferably diverge slightly from each other in a downward direction, preferably at the same angle as the perforate walls 91 and 96 above described. In their positions of FIGURE 3, the opposed upper edges of the side walls 121 and 122 lie beneath the inner edges of the shelves 78 and 79 and form a smooth continuation of the opening 81 defined between such shelves. An upstanding central web 123 is centered between the side walls 121 and 122 and extends between the end walls 117 and 118 to which it is fixed for dividing the heating chamber 115 into a pair of subchambers 119 and 120. The web 123 tapers downwardly from a location closely adjacent the upper edge thereof, the tapered faces of the web preferably lying substantially at the same angle of inclination to the vertical as the side walls 121 and 122, here approximately four degrees. The upper end of web 123 is preferably peaked to prevent gathering of granules on the top thereof. In its position of FIGURE 3, the web 123 lies directly below the divider 58 in the holding chamber 31. The upper end of the heating box 116 lies closely and slideably below the bottom face of the shelves 78 and 79 while the bottom of the box 116 is spaced somewhat above the housing wall 15.

A horizontal rail 124 is affixed to each of the box end walls 117 and 118 on the outer surface thereof. The outer surface of each of the rails 124 is provided with a bushing strip of suitable bearing material, such as brass or the like, which extends longitudinally therealong and in turn is disposed in the corresponding grooves 111 and 112 with a vertical clearance exceeding that between said heating box and shelves 78 and 79 for supporting the box 116 for sliding movement along the length of the transfer passage 101.

Figure 6:
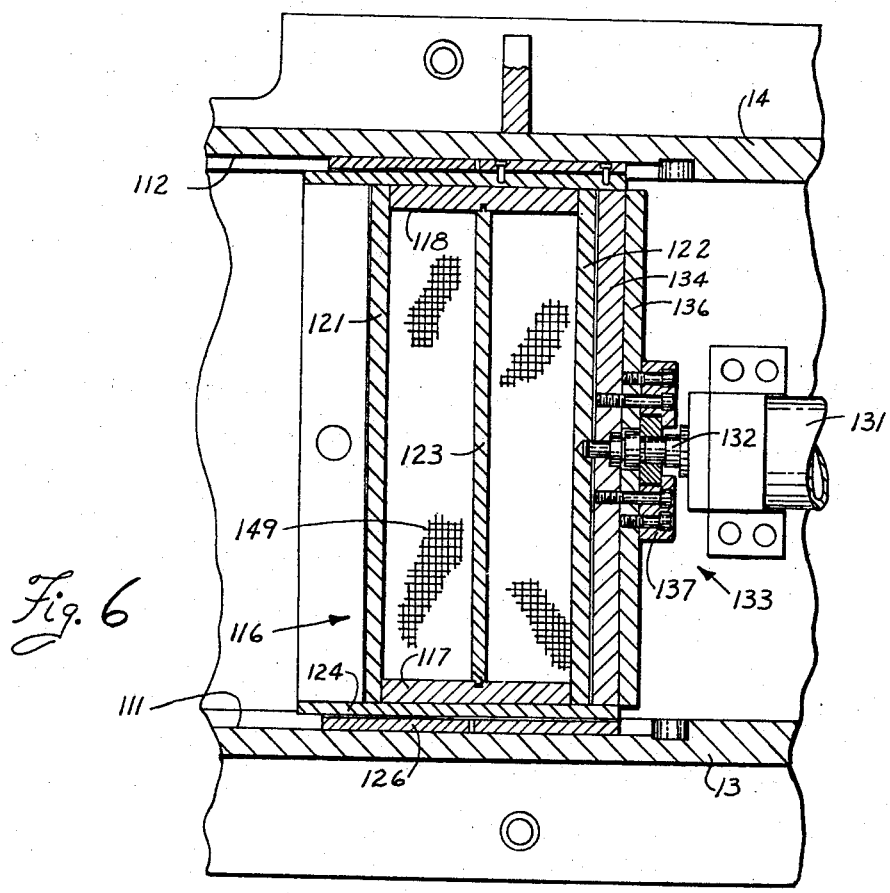
FIGURE 6 is a fragmentary sectional view taken on the line VI—VI of FIGURE 3.

A pressure fluid cylinder 131 is spaced rightwardly, as seen in FIGURES 3 and 6, from the box 116 and is preferably centered between the walls 13 and 14. The pressure fluid cylinder 131 has a piston rod 132 which extends toward the box 116 and is affixed thereto by means of a fitting 133 so that reciprocation of the piston rod 132 will result in a corresponding reciprocation of the box 116 along the grooves 111 and 112. The pressure fluid cylinder 131 has a stroke sufficient to move the box 116 continuously from its position shown beneath the passage 98 leftwardly to a limiting position indicated by broken lines 116A in which position the fitting 133 is located over the rightward portion of the passage 108. The pressure fluid flow to the cylinder 131 is actuatable by any convenient means here indicated schematically at S so that the leftward half of the heating box 116 passes over the opening 108, the cake of heated plastic material therein falling therefrom into the opening 108. The lower ends of the subchambers 119 and 120 are preferably slightly smaller in cross section than the guide passage 108 so that the contents of the subchambers fall freely in the passage 108. The pressure cylinder 131 then places the rightward side of the heating box 116 over the passage 108 so that the cake of plastic material drops from the subchamber 120 into the opening 108. The cylinder continues to move the box 116 to its leftward limiting position indicated in broken lines 116A.

The fitting 133 (FIGURES 3 and 6) comprises a bar 134 which is affixed to the rightward face of the box wall 122 above the wall 15 and extends the length of said wall 122. The bar 134 receives the end of the piston rod 132 through an opening in the middle thereof. A backup plate 136 is fixed by any convenient means such as screws to the outer face of the bar 134 and extends the length thereof. Suitable clamp blocks 137 are releasably secured to the backup plate 136 and bar 134 on either side of the piston rod 132 for preventing withdrawal of the piston rod away from the box 116. The lower, outer edge of the bar 134 is longitudinally grooved for receiving the upper edge of a depending brush 138 therewithin, the brush being secured to the bar 134 by set screws 139 carried adjacent to the edge of the backup plate 136. The brush 138 extends across the bottom wall 15 from the side wall 13 to the side wall 14 and is provided with relatively stiff, downwardly extended bristles, which may be of wire, which are arranged to brush along the wall 15 as the box 116 reciprocates along the transfer passage 101. Alternatively, the brush 138 may be replaced with a suitable wiper, preferably of Teflon.

An air outlet manifold 141 (FIGURES 3, 4 and 6) is disposed directly below the entrance passage 98 and holding chamber 31. The air outlet manifold 141 has upstanding walls 142 and 143 disposed directly below the bottom of the side walls 121 and 122, respectively, on the box 116. The outlet manifold 141 also has upstanding end walls 146 and 147 which are directly disposed beneath the corresponding end walls of the box 116. A solid bottom wall 148 closes the lower end of the outlet manifold 141. The outlet manifold 141 is provided with a horizontal perforate upper wall 149 which may comprise a perforated plate or if desired, a wire mesh screen. The perforate upper wall 149 allows passage of air downwardly therethrough but prevents passage of plastic granules of normal size therethrough. If desired, the central portion of the perforate upper wall 149 may be supported from beneath by suitable horizontal bars 151 extending between the upstanding walls of the outlet manifold. An outlet conduit 152 communicates with the interior of the outlet manifold 141 through the lower wall 138 thereof and is preferably centrally located with respect thereto. The outlet conduit 152 preferably is bent at a right angle immediately beneath the bottom of the outlet manifold to extend horizontally away therefrom, as indicated in FIGURE 3. The exhaust fluid from the conduit 152 may be exhausted into the atmosphere or, alternatively, may be recirculated, such recirculated fluid preferably being filtered to preclude re-entry of any debris from the outlet manifold 141 into the apparatus 10.

A portion of the horizontal wall 15 of the housing is omitted at the location of the outlet manifold to provide a vertical opening 153 through which the manifold 141 is snugly vertically slideable by means hereinafter described. The outlet manifold 141 is shown in its uppermost position in FIGURE 3. In such position, the perforate wall 149 is raised above the wall 15 and into snug contact with the bottom of the heating box 116, the outlet manifold forceably urging the heating box upwardly against the shelves 78 and 79 to prevent loss of heated air or granules transversely past the upper and lower edges of said heating box. The outlet manifold 141 may also be dropped to a position spaced below the heating box 116 in which the upper surface of the perforate wall 149 is flush with the upper surface of the wall 15 thus allowing the heating box to drop slightly from the shelves 78 and 79 while still remaining well spaced above the floor of the transfer chamber. Thus, the heating box is freed for transfer by the cylinder 131.

More particularly, considering the means mounting and reciprocating said outlet manifold, a generally U-shaped bracket 156 has upstanding legs generally indicated at 157 and 158, which are affixed to and depend from the underside of the opposed table members 12 on opposite sides of the outlet manifold 141. The bracket 156 further includes a bight member 159 fixed to and extending in between the lower ends of the legs 157 and 158 and preferably centered below the outlet manifold 141. Vertical support rods 161 and 162 are affixed to and depend from the bottom wall 148 of the outlet manifold 141 on opposite sides of the outlet conduit 152. The support rods 161 and 162 extend downwardly through the bight member 159 and through suitable bushings 163 and 164 carried on the bight member 159, for guiding the outlet manifold for vertical movement with respect to the housing 11. A vertically aligned pressure fluid cylinder 167 is carried by hanger plates 168 and 169 depending on opposite sides of the bight member 159. The pressure fluid cylinder 167 has an upwardly extending piston rod 171 which is rigidly affixed to the central portion of the bar 172 joining the lower ends of the support rods 161 and 162. Thus, the vertical movement of the piston rod 171 results in a corresponding vertical movement of the outlet manifold 141.

In the particular embodiment shown, the end walls 146 and 147 each carries an outwardly extending slide block 173, which bears slideably against the corresponding one of the housing walls 13 and 14, to prevent any tendency of the outlet manifold 141 to cock about the longitudinal axis of the housing 11.

Operation

Although the operation of the apparatus embodying the invention is set forth to some extent above, same will now be summarized to insure a complete understanding of the invention.

Figure 4:
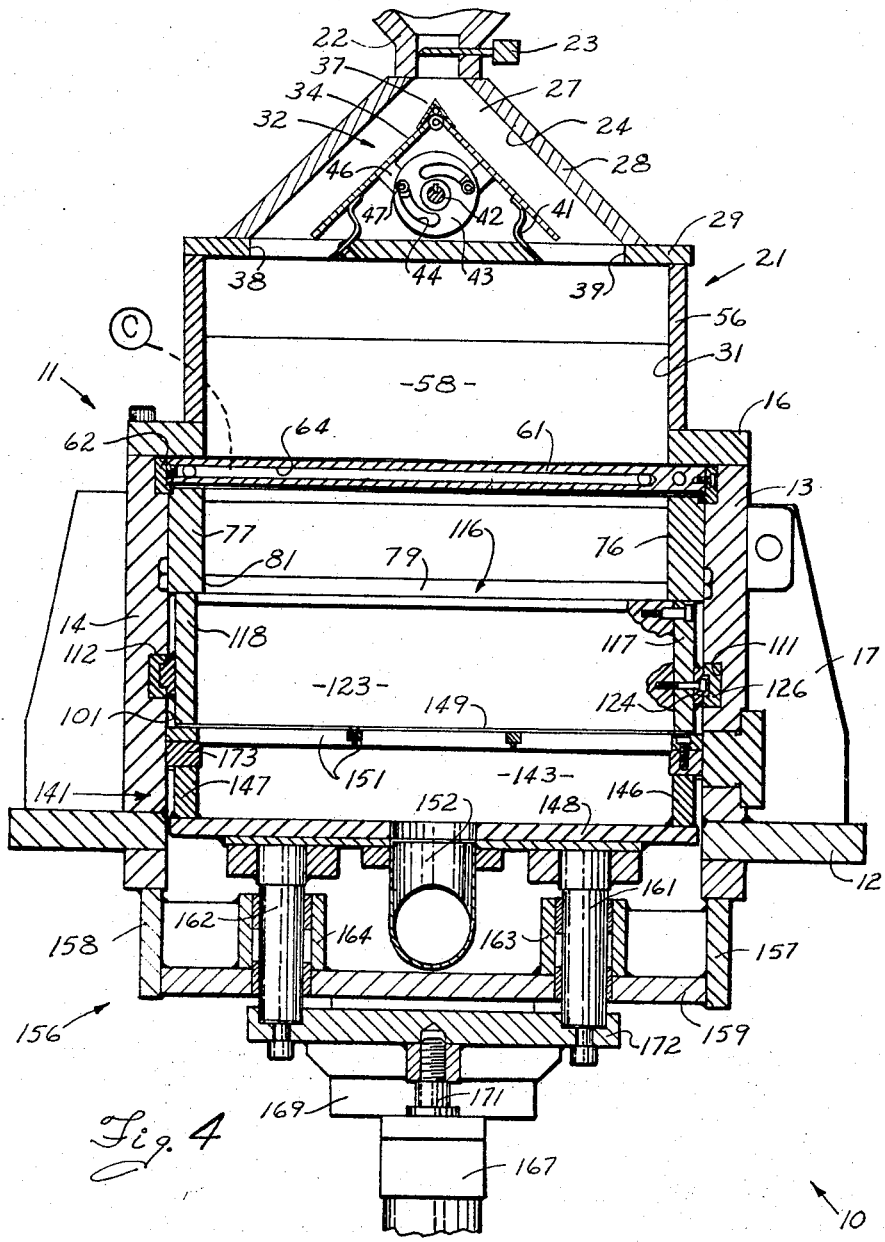
FIGURE 4 is a partially broken sectional view taken on the line IV—IV of FIGURE 3.
Figure 5:
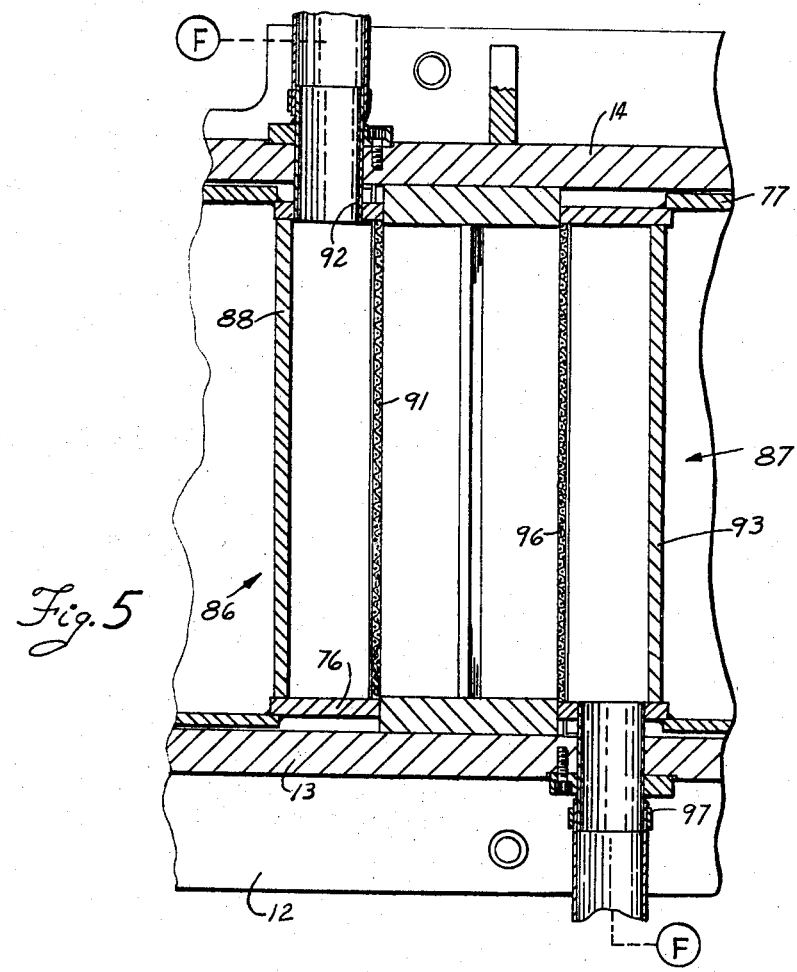
FIGURE 5 is a fragmentary sectional view taken on the line V—V of FIGURE 3.

Operation of the apparatus 10 can begin with the parts thereof positioned as shown in FIGURES 3 and 4. A suitable coolant, such as water, from source C is circulated through the coolant passages 64 in the gate 61. Thereafter, the valve 23 at the bottom of the hopper 22 is opened for suitable metering, such as for a timed interval, so as to allow granular organic plastic material therein to fall into the spreading chamber 24 between the walls 28 and the downwardly diverging deflection plates 34. The granules pass downwardly along the deflection plates 34 and the granule stream is spread by an amount determined by the angle between such deflection plates. As above mentioned, the divergence of the deflection plates 34 is controlled by the rotational setting of the disk 43 and, hence, by the rotation position of the flange 49 with respect to the indicia 51 on the wall of the metering chamber. Thus, the distribution of material in the holding chamber 31 will be a function of the spacing of the deflection plates 34 and preferably such material will lie at an even depth throughout the length of the holding chamber 31. Due to the centered arrangement of the metering chamber, holding chamber, and divider plate 58, equal amounts of granular material will be deposited on each side of the divider plate 58. The flow of granular material into the holding chamber 31 is preferably stopped by shutting off the valve 23 before the level of granules rises above the top of the divider 58. Thereafter, the pressure fluid cylinder 67 is actuated to retract the piston rod 69 and slide the gate 61 rightwardly, thus bringing the opening 63 therein sequentially into communication between the leftward half of the holding chamber 31 and entrance passage 98 and then between the rightward halves of the holding chamber 31 and entrance passage 98 (FIGURE 3). Thus, the granules from the leftward half of the holding chamber 31 tend to fall through the entrance passage into the leftward half of the heating chamber 115 between the walls 121 and 123 thereof and the granules from the rightward half of the holding chamber 31 tend to fall into the rightward half of the heating chamber 115 between the walls 123 and 122 thereof. This provides, within relatively close limits, an equal amount of granules on either side of the web 123, such granules being levelly distributed therealong. The level of the granules is preferably at or somewhat below the chamfered upper portion of the web 123. The pressure fluid cylinder 67 is then actuated to close the gate 61, thus returning it to its position shown in FIGURE 3.

The air source F is continuously energized while the machine is in operation and heated air flows therefrom into the inlet manifolds 86 and 87 and then inwardly through the perforate walls 91 and 96, in uniform distribution therefrom. The heated air is at a somewhat greater pressure than atmospheric pressure, its pressure being sufficient to move it at a moderate rate downwardly through the charge of granules in the heating chamber 115, through the perforate wall 149 at the top of the outlet manifold 141, into the manifold 141 and out the exhaust conduit 152. Leakage of air and particles past the top and bottom edges of the box is prevented by the constant urging of the box against the shelves 78 and 79 by the outlet manifold 141.

Figure 8:
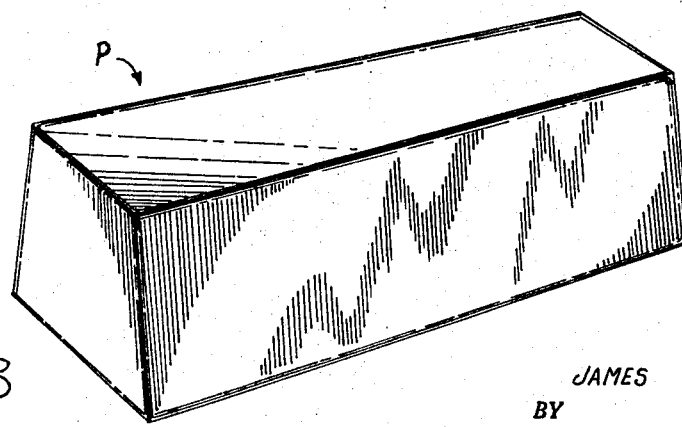
FIGURE 8 is an oblique view of one of the cakes of plastic material resulting from preheating of plastic granules in the apparatus embodying the invention.

The movement of heated air through the heating chamber is fast enough to provide even and relatively rapid heating of the granules, but not so fast as to tend to materially agitate such granules. Instead, the air moving downwardly therethrough tends to compact the granules somewhat. As the temperature of the granules rises, the granules, depending on the material involved, normally soften and tend to adhere to each other to form a substantially monolithic porous cake in each of the subchambers 119 and 120, one of such cakes being indicated at P in FIGURE 8. After a preselected period of time, the granules will be brought to the desired temperature.

At this point the pressure fluid cylinder 167 is energized to drop the piston rod 171 thereof and, hence, to drop the outlet manifold 141 away from the box 116, thus bringing the top of the perforate wall 149 into coplanar relationship with the top of wall 15. Normally the cakes do not adhere to the walls of the heating box sufficiently to support same in the box when the outlet manifold drops so that the cakes drop with the outlet manifold. At this point, the source S, in response to any convenient manual or automatic actuation, energizes the cylinder 131 and causes the piston rod 132 thereof to extend moving the heating box 116 leftwardly toward its limiting position 116A. Leftward movement of the box slides the dropped cakes across the perforate wall and transfer passage floor toward the outlet passage 108, there being little if any tendency of the plastic material to stick thereto since it was insufficiently adhesive to remain in the heating box. As the box moves leftwardly, the brush 138 is dragged across the perforate wall 149. The brush 138 moves before it any whole granules or large particles which may have become disengaged from the granule cakes and at the same time tends to drive through the screen 149 any relatively small particles of plastic material lying upon or stuck to the screen 149 thereby dropping same into the exhaust manifold and out of the normal path of future charges of plastic material. As the heating box 116 moves leftwardly, the leftward subchamber 119 thereof moves across the outlet opening 108, the cake in said leftward subchamber 119 thereby dropping into the opening 108 and out of the heating box. As the heating box continues to move leftwardly, the rightward subchamber 120 moves across the outlet 108, the cake therein dropping into said outlet 108 and falling out of the path of the heating box 116. As the heating box 116 moves into its leftward limiting position 116A, the brush 138 moves into position over the opening 108.

During the above-discussed movement of the box 116 away from the outlet manifold 141, the brush 138 sweeps any granules or granule particles which may fall from the box 116 therebefore. Such particles are thus swept into the opening 108 on top of the cakes deposited therein as the brush 138 assumes its leftwardmost broken line position 138A above the passage 108.

Thereafter, the cylinder 131 retracts the box 116 rightwardly to its solid line position of FIG. 3, so that a further cycle of operation may commence in the manner of the cycle above described. As the box 116 clears the passage 108, cylinder 103 is actuated to fully extend the ram 104 downwardly into passage 108 to urge the cakes therein downwardly positively into the consuming means, the ram 104 continuing such urging until the cakes are consumed or until a further pair of cakes are ready to be shifted toward the passage 108 at which point the ram 104 is lifted to its upper position shown.

Because of the smoothness of the heating chamber walls and because of the downwardly diverging shape of the walls 121, 122 and 123 there is no tendency for the cakes to become mechanically locked in the sub-chambers and friction thereon during downward movement thereof is minimized. Thus, the cakes normally fall as a whole from the box 116 and no plastic material is left within said box 116. Therefore, upon completion of the leftward stroke of the cylinder 131, the passages and chambers through which the granules and the cakes flow are in a clean condition, free of plastic material and ready for a further cycle of operation upon return of the box 116 to its rightwardmost position shown in FIGURE 3.

It should be particularly noted that the inlet manifold perforate walls 91 and 96, because of the direction of air flow therethrough and their downwardly diverging orientation, have no contact with the granules moving therepast, and as a result no granules can stick thereto. On the other hand, the outlet perforate wall 149, although in contact with the plastic material during heating, is moved positively away from the heating area, prior to shifting of the heated plastic material leftwardly thereacross. The perforate wall 149 is in addition thoroughly cleaned by vigorous brushing thereof by the brush 138 on both the leftward and return strokes of the cylinder 131 and is thereby freed from any plastic material that may tend to contaminate future batches of material heated by the apparatus.

Cooling of the gate 61 also serves to prevent adherence of plastic material thereto by maintaining the plastic material supported thereon in the holding chamber 31 at a sufficiently low temperature that it does not soften and become sticky. Thus, as the gate 61 moves rightwardly to admit plastic granules to the entrance passage 98, none of the plastic material will adhere thereto. The remaining surfaces with which the plastic material comes into contact during and after heating are relatively smooth, and moreover, the plastic material is positively removed therefrom, by either the brush 138 or ram 104. Thus, no plastic material will remain in the apparatus to damage the future batches.

It should also be noted that movement of the plastic material in the apparatus 10 is left solely to gravity when the material is in its unheated, granular form and that after the material has been heated to a softened, caked condition, movement of such material does not rely solely upon gravitational forces, but rather, is positively effected or at least positively initiated by means of the pressure fluid cylinders 103 and 131.

It will be noted that the rod 132 of cylinder 131 is readily disconnected from the box 116 to allow said box to be removed from the leftward (FIGURE 3) end of the transfer passage 101 for inspection, cleaning, brush replacement or the like and to facilitate access to the outlet screen 149 and other internal parts of the apparatus without disassembly thereof.

Although not usually the case, it is contemplated that under certain conditions, the cakes in the heating box 116 may tend to adhere to the walls thereof sufficiently to stay therewithin when the exhaust manifold is dropped away from the heating box and that such adherent cakes may stay within the heating box as it moves leftwardly. To meet such circumstances, it is contemplated that, as an alternative construction, the width of the ram 104 as seen in FIGURE 3 may be reduced sufficiently as to allow same to enter the narrow upper ends of the subchambers 119 and 120 for forcing the cakes located therein downwardly and out thereof into the outlet 108. It is further contemplated that in such an alternative arrangement, the cylinder 131 may be actuated in steps so that leftward travel of the heating box 116 stops momentarily when the leftward subchamber 119 is positioned over the outlet 108 to allow the modified ram 104 to dislodge the cake therefrom and then stops again with the subchamber 121 located over the outlet 108 so that the modified ram 104 may be extended to dislodge the cake therein and, if necessary, drive same out the outlet 108.

Although a particular preferred embodiment of the invention has been disclosed above for illustrative purposes, it will be understood that variations and modifications thereof which lie within the scope of the appended claims are fully contemplated.

The embodiments of the invention in which an exclusive property or privilege is claimed are defined as follows:

1. In a machine for heating granular organic plastic material, the combination comprising:
   a source of granular organic plastic material;
   a closed sided heating chamber having an open top and bottom;
   a perforate outlet wall arranged to close the bottom of said chamber against granule flow therethrough;
   means for admitting a metered amount of granules from said source into the top of said chamber;
   a source of heated fluid and means for passing said heated fluid downwardly into said chamber, said heated fluid passing through said heating chamber and said perforate wall for heating said granules to form a cohesive cake;
   means for shifting said chamber away from said perforate outlet wall to allow removal of a heated cake from said chamber.

2. The device defined in claim 1, including means offset from said perforate wall for positively ejecting said cake endways from said heating chamber through one of said top and bottom thereof.

3. The device defined in claim 1, including an entrance passage extending upwardly from said heating chamber.

4. The device defined in claim 3, in which said means for admitting a metered amount of granules into the chamber comprises a valve disposed above said entrance passage; and including
   a spreading device below said valve adjustable for providing a uniform depth of granules in said chamber.

5. The device defined in claim 3, in which said admitting means includes a spreading device spaced above said entrance passage and below said source, for distributing said granules laterally, a holding chamber disposed between said spreading device and said entrance passage for holding a charge of plastic granules and a gate for closing the bottom of the holding chamber, said gate being actuable for opening the bottom of said holding chamber for allowing granules therein to drop through said entrance passage into said heating chamber.

6. The device defined in claim 3, and in which said fluid passing means comprises at least one inlet manifold adjacent at least a portion of the perimeter of the entrance passage, said manifold being connected to said source of heated fluid and having a perforate wall facing said entrance passage for admitting heated fluid from said manifold into said entrance passage and, hence, into the top of said heating chamber.

7. The device defined in claim 1, including an outlet manifold disposed below said heating chamber, said perforate outlet wall forming the top of said outlet manifold, and means for exhausting heated fluid from said outlet manifold.

8. The device defined in claim 1, including means for retracting said perforate outlet wall outwardly away from said heating chamber and away from said cake.

9. The device defined in claim 1, including means supporting said heating chamber for substantially horizontal sliding movement across and beyond said outlet perforate wall and including cleaning means fixed with respect to said heating chamber for sweeping across said perforate outlet wall as the heating chamber reciprocates whereby to remove plastic material from said perforate wall.

10. The device defined in claim 5, in which said spreading device comprises a generally triangularly shaped spreading chamber supported upon said holding chamber and opening downwardly thereinto at opposite ends thereof, a downwardly diverging pair of deflection plates extending generally parallel to the triangle-defining walls of said spreading chamber and pivotally connected to each other at the upper ends thereof for pivotal motion about an axis fixed with respect to said spreading chamber, said deflection plates extending the width of the spreading chamber, a shaft extending through said spreading chamber below and substantially parallel with the pivot axis, a spirally slotted disk axially supported upon such shaft for rotation therewith, means fixed with respect to said deflection plates and slideably engaging the slots of said disk, so that a rotation of said shaft will effect movement of said deflection plates away from each other, and springs urging said deflection plates outwardly away from each other, the flow of granules through said spreading device being spread by said deflection plates.

11. The device defined in claim 9, in which a vertical clearance is provided between said supporting means and said heating chamber, wall means are disposed above said heating chamber at locations above at least a portion of the periphery thereof and raising means are provided for urging said outlet wall upwardly to snugly sandwich said heating chamber between said wall means and said outlet wall.

12. In a machine for preheating a granular organic plastic material, the combination comprising:
a source of granular plastic material;
a spreading chamber disposed below said source and a device in said spreading chamber adjustable for spreading granule flow therethrough;
a holding chamber for receiving granules from said spreading device;
a gate normally closing the lower end of said holding chamber and means actuable for opening said gate to allow granules therein to fall therefrom;
an entrance passage providing a path for granules falling from said holding chamber;
a source of heated air under pressure and an opposed pair of inlet manifolds fed thereby, the opposed walls of said inlet manifolds bounding said entrance passage and being perforate for allowing air flow therethrough to said entrance passage;
a horizontal transfer passage communicating with the lower end of said entrance passage and having top, bottom and side walls;
a heating chamber having open upper and lower ends and closed sides, said heating chamber being disposed in said transfer passage immediately below said entrance passage for filling with said granules, the lower end of said heating chamber being spaced above said bottom wall of said transfer passage, said heating chamber being slideably supported on the side walls of said transfer passage for reciprocation therealong;
means for moving said heating chamber from beneath said entrance passage along said transfer passage;
an outlet manifold aligned with said entrance passage and having a perforate upper wall normally disposed against the lower end of said heating chamber for allowing said heated air to exhaust therethrough but preventing escape of granules therethrough;
means for lowering said outlet manifold away from the lower end of said heating chamber to a position in which said perforate upper wall is level with said bottom wall of said transfer passage; and
an outlet opening in the bottom wall of said transfer passage spaced from said entrance passage.

13. The device defined in claim 12, including a stiff bristled brush mounted on the side of said heating chamber away from said outlet opening, said brush extending the width of said transfer passage and slideably engaging the bottom wall thereof for sweeping granules on said perforate outlet manifold wall and bottom transfer passage wall in front thereof into said outlet opening as said heating chamber moves toward said outlet opening.

14. The device defined in claim 12, including also means for positively ejecting said cake from said heating chamber into said outlet opening which comprises a pressure fluid cylinder driven ram and including an opening through the top wall of the transfer passage above said outlet opening for admitting said ram therethrough, said pressure fluid cylinder having a sufficient stroke to allow the ram to pass downwardly through said top wall opening and said heating chamber into said outlet opening.

15. The device defined in claim 12, in which said means actuable for opening said gate comprises a pressure fluid cylinder and in which said means for moving said heating chamber comprises a further pressure fluid cylinder, said further pressure fluid cylinder being disposed on the side of said heating chamber away from said outlet opening.

16. The device defined in claim 12, in which said perforate walls of said inlet manifolds diverge downwardly and the ones of said walls of said heating chamber which extend transversely of said transfer passage extend divergently downwardly substantially as a continuation of planes of said perforate walls of said inlet manifold.

17. The device defined in claim 12, in which at least one upstanding divider wall extends across said holding chamber transversely of the transfer passage for dividing said holding chamber into at least two substantially equal portions and including an upstanding divider web extending transversely of the transfer passage across said heating chamber and located between the opposed walls thereof, the said divider web lying directly below said divider wall when said heating chamber is positioned above said outlet manifold.

18. The device defined in claim 12, in which said gate includes a plurality of coolant passages therein and further including a source of liquid coolant connected to said passages for maintaining said gate at a temperature below that required to soften the plastic granules in said holding chamber.

19. A process for preheating a granular organic plastic material, comprising the steps:
causing a charge of granular plastic material to fall into a heating chamber through a preselected path in response to gravitation;
causing a stream of heated gas to flow downwardly through the charge of granules in said heating chamber to evenly heat said granules so as to form at least one cake of softened plastic material;
positively transferring said heating chamber with said cake therein horizontally away from said path;
discharging said cake from the heating chamber;
returning said heating chamber to said path for receiving a further charge of granules.

References Cited
UNITED STATES PATENTS

| | | | |
|---|---|---|---|
| 1,829,268 | 10/1931 | Edwin | 263—36 |
| 2,852,809 | 9/1958 | Miles et al. | 18—30 |
| 2,889,441 | 6/1951 | McMinn et al. | 18—30 |
| 3,155,398 | 11/1964 | Fischer et al. | 263—21 |
| 3,214,844 | 11/1965 | Oates et al. | 34—10 |

FREDERICK L. MATTESON, JR., *Primary Examiner.*

J. J. CAMBY, *Assistant Examiner.*